United States Patent [19]

Dvorak et al.

[11] Patent Number: 4,965,694
[45] Date of Patent: Oct. 23, 1990

[54] REMOTE CONTROLLED CIRCUIT BREAKER SYSTEM

[75] Inventors: Robert F. Dvorak, Mount Vernon, Iowa; Kurt W. Swenson, Lexington, Ky.

[73] Assignee: Square D Company, Palatine, Ill.

[21] Appl. No.: 331,430

[22] Filed: Mar. 30, 1989

[51] Int. Cl.$^5$ .......................... H02H 3/30; H02J 13/00
[52] U.S. Cl. .................................... 361/64; 361/169.1; 307/41; 307/115; 370/85.8
[58] Field of Search ........................ 361/64, 66, 68–70, 361/166–169.1, 171, 172, 183, 187, 189–193; 307/31, 33–35, 38–41, 87, 242, 239, 241, 113, 115, 125, 126, 130, 134, 139, 140, 143; 340/825.04, 825.08, 825.1, 825.11, 825.12, 825.13, 825.18; 375/105; 364/492, 493; 370/85.8, 95.2; 363/56

[56] References Cited

U.S. PATENT DOCUMENTS

| | | | |
|---|---|---|---|
| 3,769,520 | 10/1973 | Carrington | 307/41 |
| 3,820,198 | 6/1974 | Scofield | 361/169.1 X |
| 3,846,676 | 11/1974 | Ryczek et al. | |
| 4,001,643 | 1/1977 | Ramberg et al. | |
| 4,060,735 | 11/1977 | Pascucci et al. | 307/3 |
| 4,110,632 | 8/1978 | Wyland | 307/117 |
| 4,463,401 | 7/1984 | Grenier et al. | 361/72 |
| 4,477,855 | 10/1984 | Nakayama et al. | 361/54 |
| 4,477,856 | 10/1984 | DePuy | 361/72 |
| 4,495,538 | 1/1985 | Thomas | 361/115 |
| 4,531,172 | 7/1985 | Mertz | 361/13 |
| 4,593,349 | 6/1986 | Chase et al. | 364/200 |
| 4,604,674 | 8/1986 | Hamel | 361/73 |
| 4,617,472 | 10/1986 | Slavik | 307/10.1 |
| 4,736,367 | 4/1988 | Wroblewski et al. | 370/85 |

Primary Examiner—A. D. Pellinen
Assistant Examiner—David Osbern
Attorney, Agent, or Firm—Larry I. Golden; Jose W. Jimenez

[57] ABSTRACT

A common power supply (20) is often used to provide power for actuating a plurality of circuit breakers (18a–18z) in response to actuation signals from remote control lines (16a–16z). But a large and expensive power supply (20) must be used to deliver enough power to actuate several circuit breakers simultaneously. Moreover, if the circuit breakers (18a–18z) are connected to large electrical loads (21a–21z) and are actuated simultaneously, then the line voltage (V1) will sag substantially. To solve these problems, a time-sharing device (14) enables respective ones of the circuit breakers to respond to their actuation signals only at different times. Preferably, the time-sharing device (14) polls each of the remote control lines (16a–16z) and delivers an actuation signal from each polled remote control line to a preselected number of circuit breakers (21a–21z) which are associated with the polled remote control line. In most instances a control line controls only one circuit breaker, although one control line may be used to control a small number of circuit breakers which typically would control the power delivered to related electrical loads. The power supply (20) is sized to actuate the largest number of circuit breakers that are associated with any one control line. Since the maximum number of circuit breakers that can be simultaneously actuated is limited to the largest preselected number, the size of the power supply is reduced without sacrificing system performance.

25 Claims, 3 Drawing Sheets

REMOTE CONTROLLED CIRCUIT BREAKER SYSTEM

TECHNICAL FIELD

This invention relates generally to remote controlled circuit breaker systems, and more particularly to a time-sharing interface for a remote controlled circuit breaker system.

BACKGROUND ART

Remote controlled circuit breakers are used in energy management systems and home automation systems to automatically control the application of power to a variety of electrical loads. Manufacturing industries, in particular, use remote controlled circuit breakers in conjunction with peak-shaving devices to limit the amount of energy consumed The remote controlled circuit breakers disable less important electrical loads when energy consumption begins to rise above a certain "peak" amount. Since the cost of energy disproportionately rises for consumption above the "peak" amount, the remote controlled circuit breakers help manage energy costs.

Many remote controlled circuit breakers require an external low voltage power supply. Control lines connected to each remote controlled circuit breaker deliver an actuation signal which renders the circuit breaker conductive or non-conductive to connect or disconnect line voltage to or from respective loads. When actuation signals are delivered simultaneously to more than one circuit breaker, the power supply must provide enough power to actuate all of the circuit breakers which receive an actuation signal. Since the power supply may be required to actuate a number (N) of circuit breakers simultaneously, it must be capable of providing N times the power or current required to actuate a single circuit breaker. Therefore a relatively large and expensive power supply is required in this case.

The size and cost of the power supply, however, is not the only disadvantage of the above-described remote controlled circuit breaker system. If a number of large electrical loads are energized simultaneously, the line voltage sags momentarily until steady state conditions are reestablished. Substantial sags in the line voltage can induce undesirable voltage transients on the power system.

DISCLOSURE OF INVENTION

The primary object of the present invention is to provide a remote controlled circuit breaker system which reduces the size of the associated power supply.

Another object of the present invention is to provide a remote controlled circuit breaker system which reduces line voltage sag and transients.

Yet another object of the present invention is to provide a method for controlling a plurality of circuit breakers in accordance with the above-mentioned objectives.

To reduce the size of the power supply and prevent line voltage sag and transients in a system of remote-controlled circuit breakers, no more than a preselected number of the circuit breakers are actuated at a given time. The circuit breaker system has a plurality of remote control lines for conveying respective actuation signals, and a plurality of circuit breakers, each having means responsive to a respective one of the actuation signals for actuating the circuit breaker. The system further includes a time-sharing means for preventing said actuation signals from actuating more than a preselected number of said circuit breakers at the same time. The time-sharing means, for example, is connected between the remote control lines and the circuit breakers and delivers an actuation signal from one of the remote control lines at a time to the circuit breakers which are associated with the one remote control line. Therefore, the power supply need have only a sufficient size to actuate the largest number of circuit breakers that are associated with any one control line.

Preferably, the time-sharing device polls each of the control lines for a predetermined period of time, and couples a control line being polled to a preselected number of circuit breakers associated therewith for the predetermined period of time. The preselected number of circuit breakers associated with the control line being polled are actuated upon reception of an actuation signal on the polled control line. In most systems a control line controls only one circuit breaker. In some systems, however, it may be desirable for one control line to control a small number of circuit breakers which control the power delivered to related electrical loads.

The remote controlled circuit breaker system of the present invention reduces line voltage sag and transients during actuation of the circuit breakers, because the time-sharing device permits only a limited number of the electrical loads to be switched on-line simultaneously. Only a preselected number of circuit breakers are actuated during the predetermined period of time that the time-sharing device is polling a particular control line. Even if every control line which connects with the time-sharing device carries an actuation signal, only the actuation signal on the control line being polled is delivered to the preselected number of circuit breakers associated with the polled control line.

In accordance with another feature of the invention, the polling of the control lines is inhibited when the power supply voltage is less than a predetermined value. This ensures that there will be a sufficient power supply voltage for actuation of the circuit breakers. Polling could also be inhibited until the actuation of a circuit breaker is completed. This could permit the time for actuating a circuit breaker to be much longer than the usual time for polling or scanning a single control line, and therefor the polling or scanning rate could be increased to minimize the response time of the system to an actuation signal.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

BEST MODES FOR CARRYING OUT THE INVENTION

Figure 1:
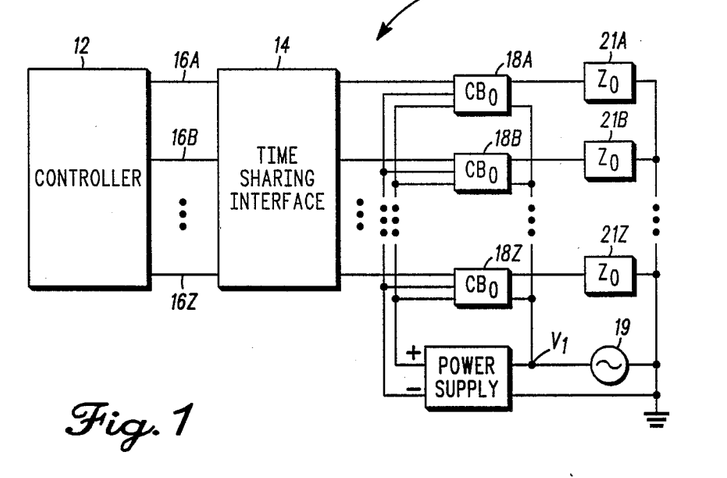
FIG. 1 is a block diagram of a remote controlled circuit breaker system in accordance with the present invention.

Referring initially to FIG. 1, there is shown a remote controlled circuit breaker system generally designated 10 which incorporates the present invention. Remote control signals from a controller 12 are supplied over control lines 16a–16z to respective circuit breakers (CB) 18a–18z which control respective electrical loads (Z) 21a–21z. As illustrated for a single-phase alternating current power source 19, the loads are connected in series with their respective circuit breakers, and all of the loads are connected in parallel to the power source. In addition, a common power supply 20 is used to provide power for actuating the circuit breakers 18a–18z in response to the actuation signals. The power supply 20 must be sized to deliver enough power to the circuit breakers which are actuated simultaneously. Moreover, if the electrical loads 21a–21z and are actuated simultaneously, then the line voltage (Vl) will sag substantially.

In accordance with an important aspect of the invention, the circuit breaker system 10 further includes a time-sharing means 14 for preventing the actuation signals from actuating more than a preselected number of the circuit breakers 21a–21z at the same time. The time-sharing means 14, for example, is connected between the remote control lines 16a–16z and the circuit breakers 18a–18z and delivers an actuation signal from one of the remote control lines at a time to the circuit breakers which are associated with the one remote control line. Therefore, the power supply need have only a sufficient size to actuate the largest number of circuit breakers that are associated with any one control line. Moreover, line voltage (Vl) sag and transients are reduced because only a limited number of the loads 21a–21z are connected or disconnected from the power source 19 at any one time.

Preferably, the time-sharing device polls each of the control lines 16a–16z for a predetermined period of time, and couples a control line being polled to a preselected number of circuit breakers associated therewith for the predetermined period of time. The preselected number of circuit breakers associated with the control line being polled are actuated upon reception of an actuation signal on the polled control line. As further described below, during actuation a circuit breaker is energized by the power supply 20 and is rendered conductive or non-conductive, as will be described in greater detail below. By polling or selecting the control lines 16a–z, the time-sharing interface 14 allows only a preselected number of circuit breakers 18a–z to receive actuation signals at any given time.

Typically, each control line 16a–z is uniquely associated with a single circuit breaker 18a–z. Alternatively a preselected number of circuit breakers 18a–z could be associated with a single control line. For instance, if circuit breakers 18a, 18b control related or complementary electrical devices, both circuit breakers 18a, 18b could be actuated by an actuation signal delivered by a single control line 16a, for example, by connecting in parallel the control inputs of the two circuit breakers 18a, 18b. In this case, the power supply 20 should be sized to actuate a preselected number of circuit breakers simultaneously, e.g., two circuit breakers 18a, 18b. However, in the following description of the preferred embodiment, it will be assumed that each control line 16a–z delivers an actuation signal for receipt by one respective circuit breaker 18a–z.

The time-sharing interface 14 polls one control line at a time, and, preferably, sequentially polls each control line 16a to 16z. Each control line 16a–z is polled for a predetermined amount of time, and an actuation signal delivered from a control line 16a–z being polled is routed to the circuit breaker 18a–z which is associated with the polled control line. In response to the actuation signal, an actuation means such as a coil or motor (not shown) of the associated circuit breaker 18a–z is selectively connected to the power supply 20 to energize the coil or motor for rendering the circuit breaker conductive or nonconductive. Therefore, the power supply 20 need be sized to actuate only one circuit breaker 18a–z at a time, and, thus, is smaller and less expensive than power supplies used in remote controlled circuit breaker systems which do not include a time-sharing interface.

Figure 2:
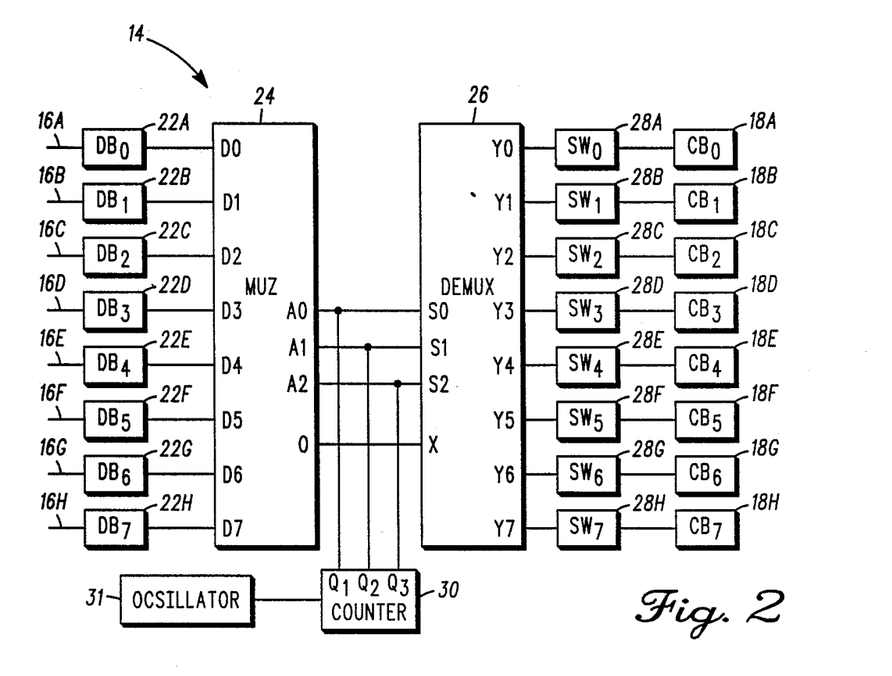
FIG. 2 is a block diagram of a time-sharing interface in accordance with the present invention.

Referring now to FIG. 2, there is shown a block diagram of the time-sharing interface 14. In this example, the interface 14 receives eight control lines 16 and controls eight circuit breakers 18a–18h. The actuation signals on each of the control lines 16a–16h are debounced by respective debouncing circuits (DB) 22a–22h. The respective debounced actuation signals are received by eight data input lines D0–D7 of an 8:1 multiplexer 24. The multiplexer 24 has a multiplexed data output line 0 which delivers an actuation signal received by a selected one of the data lines D0–D7 to a multiplexed data input line X of a de-multiplexer or decoder 26. The demultiplexer or decoder 26 has eight data output lines Y0–Y7 connected to respective switching circuits (SW) 28a to 28h, and routes the received actuation signal to a selected one of the data output lines and switching circuits associated with the actuation signal. Each switching circuit 28a–h is coupled to and controls the actuation means associated with a respective one of the circuit breakers 18a–h, respectively.

To poll the eight control lines 16a–h, a binary counter 30 has three binary output lines Q0–Q2 which are connected to three address or select input lines A0–A2, respectively, of the multiplexer 24, and to three address or select input lines S0–S2, respectively, of the demultiplexer or decoder 26. The binary counter 30 is clocked by an oscillator 31 to repeatedly count from a binary zero (000) to a binary seven (111). Therefore, the address lines A0–A2 repeatedly and consecutively select the data input lines D0–D7, one at a time. An actuation signal, which may be present on a selected data input line D0–D7, is routed to the multiplexed data output line 0 of the multiplexer 24. Simultaneously, the select lines S0–S2 of the demultiplexer or decoder 26 repeatedly and consecutively route the actuation signal from the multiplexed data input line X to the appropriate data output line Y0–Y7 which is selected by the binary counter 30.

By way of example, suppose that the binary counter 30 outputs 011 onto address lines A0–A2, respectively, and onto select lines S0–S2, respectively. At this point in time the multiplexer 24 outputs any signal that is on data input line D3 onto its multiplexed data output line 0, and that signal, which is received by the multiplexed data input line X of the decoder 26, is output onto data output line Y3. If an actuation signal is not present on the control line 16d during the period of time that data input line D3 is being selected, then the signal received by the circuit breaker 18d via output line Y3 and switching circuit 28d will not cause the circuit breaker 18d to change its state of conductivity.

Consider also the case of an actuation signal appearing on the control line 16a while data line D3 is being selected. In this case the actuation signal on the control line 16a cannot be received by its associated circuit breaker 18a until the binary counter 30 counts from 011 to 000. When the binary counter 30 reaches 000, data line D0 is selected, and multiplexer 24 routes the actuation signal from the data line D0 to the demultiplexed data output line 0. The multiplexed input line X of the decoder 26 receives the actuation signal, and the decoder 26 routes the actuation signal to the output line Y0. Therefore, the switching circuit 28a receives the actuation signal and uses it to actuate the circuit breaker 18a.

Figure 3:
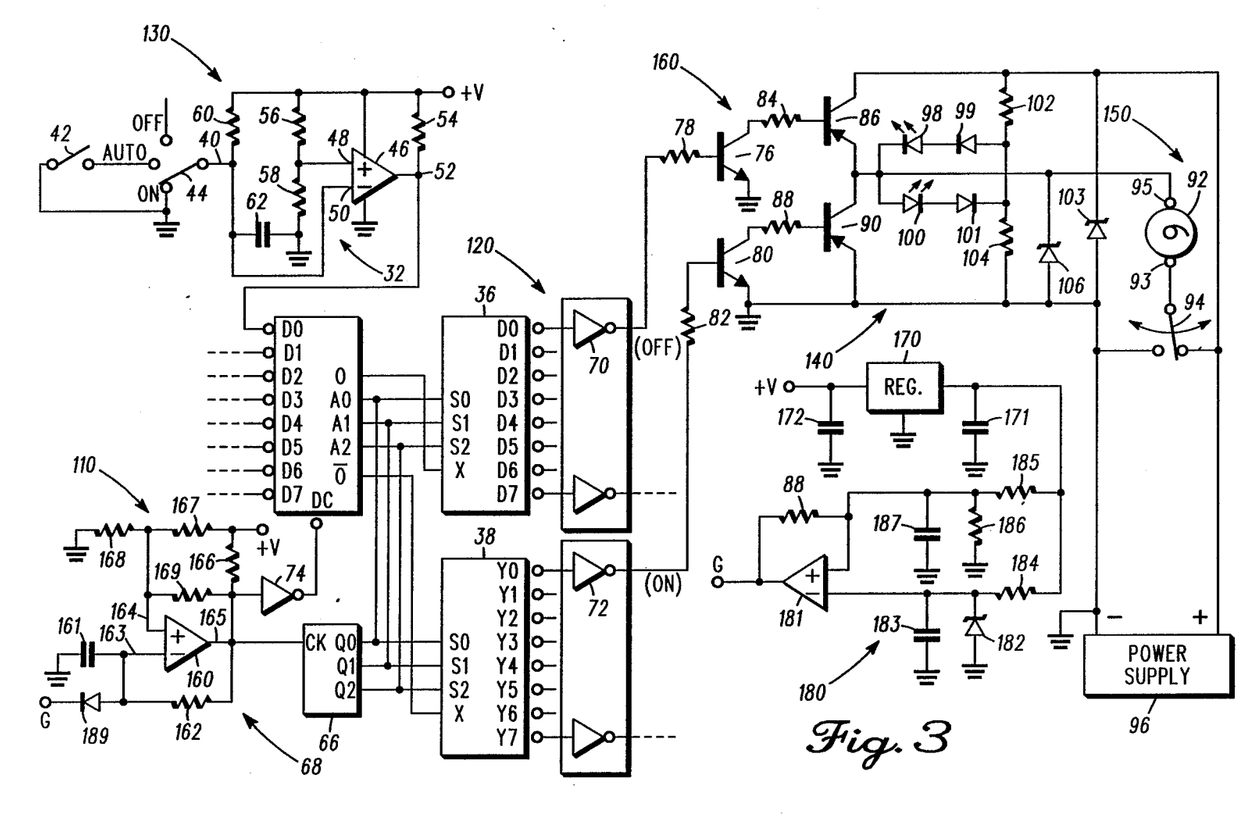
FIG. 3 is a schematic diagram of a remote controlled circuit breaker system in accordance with the present invention.

Turning now to FIG. 3 there is shown a schematic diagram of a preferred embodiment of a remote controlled circuit breaker system 110 in accordance with the present invention. The circuit breaker system 110 includes a time-sharing interface 120 connecting eight control line circuits 130 to respective ones of eight circuit breaker circuits 140, it being understood that only one of the control line circuits and only one of the circuit breaker circuits are shown in FIG. 3.

The controller circuits 130 are all substantially similar and are connected to respective data inputs $D_0$ to $D_7$ of a multiplexer 34. The circuit breaker circuits 140 are also all substantially similar and are connected to respective outputs $Y_0$ to $Y_7$ of demultiplexers or decoders 36 and 38. The multiplexer, for example, is part No. 74HC356 and the decoders are part No. 74HC238.

To provide an actuation signal on a control line 40, the control line circuit 130 includes a "local" switch 44 and a "remote" switch 42. The "remote" switch 42, for example, is typically located at a location remote from the other components in FIG. 3, or is controlled from a remote location by some additional means for signal transmission such as a radio or power-line carrier circuit (not shown). The "local" switch is typically responsive to manual input.

The actuation signal is delivered onto the control line 40 by closure of the remote switch 42 when the local switch 44 is set in an automatic position ("auto"). When the local switch 44 is set to either "on" or "off" positions, the closure of the remote switch 42 will not affect the state of the control signal on the control line 40, and instead the control line 40 will deliver a signal specified by the position of the local switch 44. An "on" signal is delivered when the local switch is in the "on" position or when the local switch is in the "auto" position and the remote switch 42 is closed. The "on" signal actuates its associated circuit breaker 150 from a non-conductive state to a conductive state unless the circuit breaker is already in a conductive state.

A comparator 46, such as part number LM339, debounces the signal generated by the closure of one of the switches 42, 44 and provides a logic level input to the data input line D0 of the multiplexer 34. The non-inverting input 48 of the comparator 46 is held at a substantially constant mid-range voltage by a voltage divider comprised of resistors 56, 58. The resistor 56, for example, has a value of 100K ohms, and the resistor 58 has a value of 220K ohms. When an "on" signal is being delivered by the switches 42, 44, as previously discussed, the voltage on the control line 40 drops from a positive value +V (e.g. 5 volts) across a resistor 60 (e.g. 100K ohms) to circuit ground. The control line 40 is connected to the inverting input 50 of the comparator 46. Thus, a logic "low" voltage appears at the inverting input 50 of the comparator 46, and the comparator 46 delivers a logic "high" voltage signal on node 52. A pull-up resistor 54 (e.g. 100K ohms) is connected between node 52 and the positive voltage source +V to define the value of the logic "high" voltage from the comparator 46.

For polling the respective controller circuits 130, a binary counter 66 (e.g. part No. 74HC93) generates a changing binary number at its output lines Q0–Q2. The output lines Q0–Q2 are connected to three address or select input lines A0–A2, respectively, of the multiplexer 34, and to three address or select input lines S0–S2, respectively, of each decoder 36, 38. A square wave oscillator 68 delivers a square wave to a clock line CK of the binary counter 66. Therefore the binary number generated by the binary counter 66 is incremented by one once every clock cycle.

As shown in FIG. 3, the square wave oscillator includes a comparator 160, such as part no. LM339, which alternately charges and discharges a capacitor 161 through a resistor 162. The comparator has an inverting input 163 and a non-inverting input 164. The capacitor 161 is connected between the inverting input 163 and signal ground, and the resistor 162 is connected from the output 165 of the comparator 160 to the inverting input 163. The comparator output 165 is connected to the positive supply voltage +V through a pull-up resistor 166. A mid-range bias voltage for the non-inverting input 164 is set by a voltage divider including resistors 167 and 168. In addition, a resistor 169 provides positive feedback from the comparator output 165 to the non-inverting input 164. Consequently, the capacitor is periodically charged and discharged between high and low threshold levels defined by the resistors 167, 168 and 169 for the respective high and low states of the comparator output 165. The comparator 160 essentially functions as a Schmitt trigger and provides a square wave on its output 165. The values of the capacitor 161 and the resistors 162 set the frequency of oscillation which is preferably about 20 Hz, for instance. The capacitor 161, for example, has a value of 0.47 microfarads, the resistor 162 has a value of 100K ohms, the resistor 166 has a value of 10K ohms, and the resistors 167, 168 and 169 have values of 330K ohms.

When the binary number for a particular control line circuit 130 appears at the output lines Q0–Q2 of the counter 66, and, thus, at the address lines A0–A2 of the multiplexer 34, the actuation signal from the control line circuit's associated control line 40 momentarily appears on a multiplexed data output line 0 of the multiplexer 34, and an inverted actuation signal appears on a multiplexed data complement output line o of the multiplexer 34. Output line 0 is connected to a multiplexed data input line X of the demultiplexer or decoder 36, and the complement output line o is connected to multiplexed data input line X of the demultiplexer or decoder 38. In response to the select lines S0–S2 of the decoders 36, 38, the signals from the multiplexed data input lines X, X are routed to the appropriate output lines Y0–Y7 which are selected by the binary number from the counter 66. Inverters 70, 72 invert the signals at the output lines Y0-Y7 of the decoders 36, 38 (and compensate for inversion through the decoders 36 and 38) and deliver actuation signals to the respective circuit breaker circuits associated with the selected output lines Y0-Y7.

The inverters 70, 72 insure that inactive signals are supplied to all of the circuit breaker circuits 140 that are not selected in response to the binary number from the counter 66. In particular, at any given time the time sharing interface 120 enables at most only one active signal to be supplied to the circuit breaker circuits 140. An active signal from one of the inverters 70 may be supplied to turn a selected circuit breaker off (assuming that it is initially on), and an active signal from one of the inverters 72 may be supplied to turn the selected circuit breaker on (assuming that it is initially off).

To avoid a breaker being left in a partially open or closed state, it is desirable to insure that any actuation of a circuit breaker that is begun during a polling interval is completed during that interval. In the preferred embodiment, the 20 Hz clocking signal from the oscillator 68 polls each of the controller circuits 130 for a polling interval of 1/20 Hz=50 milliseconds. The circuit breakers 150 can be actuated within about 33 milliseconds. Therefore actuation of a circuit breaker can always be begun and completed within a poling interval by ensuring that any actuation will be begun at the beginning of a polling interval. In other words, the state of the actuation signal is sampled at the beginning of the polling interval and held during the polling interval. In the system 110 of FIG. 3 this is done by using a multiplexer 34 (such as part No. 74HC356) which has an internal register that samples and holds the states of the data inputs (D0 to D7) in response to a clocking signal received on a data clock input DC. So that the internal register samples the states of the data inputs at the beginning of each polling interval, the output of the oscillator 68 is inverted by an inverter 74 (such as part No. 74HC04) and fed to the data clock input DC of the multiplexer. Therefore the actuation signals are sampled when the counter 66 changes its state.

The circuit breaker circuit 140 shown in FIG. 3 has a switching circuit 160 connected to the data output lines Y0, Y0 of the decoders 36, 38. The switching circuit 160 receives the signal from the inverter 70 on the base of an NPN transistor 76 via a resistor 78, and receives the inverted signal from the inverter 72 on the base of an NPN transistor 80 via a resistor 82. The transistors, for example, are part No. MPS-8098, and the resistors 78 and 82 each have a resistance of 47K ohms.

At most one of the signals from the inverters 70 and 72 are active, at a logic "high" voltage. Therefore, each time an active signal is delivered to the switching circuit 160, one transistor 76, 80 becomes conductive while the other transistor 76, 80 is non-conductive. The collector of the transistor 76 is connected via a current-limiting resistor 84 to the base of a PNP Darlington transistor 86, and the collector of the transistor 80 is connected via a current limiting resistor 88 to the base of a PNP Darlington transistor 90. The Darlington transistors are, for example, are part No. TIP-117 and the current limiting resistors 84 and 88, for example, each have a resistance of 1.8K ohms.

The conductivities of the transistors 86, 90 are controlled by the transistors 76, 80, respectively. When the transistor 80 is conductive, current flows through transistor 90 to make the transistor 90 conductive, but transistors 76 and 86 are non-conductive, and current flows through an actuator motor 92 in the circuit breaker 150 and causes the circuit breaker to become conductive. Conversely, (and assuming that the switch 94 has been thrown from its position shown in FIG. 3) when transistors 80 and 90 are non-conductive and the transistors 76 and 86 are conductive, current flows through the actuator motor 92 in the reverse direction and causes the circuit breaker 150 to become non-conductive.

The actuation of the circuit breaker 150 is also controlled by a reversing switch 94 which alternately switches one terminal 93 of the actuator motor 92 to a power supply 96. A circuit breaker operating in this fashion is, for example, part No. QOEM sold by Square D Company, Executive Plaza, Palatine, Illinois 60067. The power supply 96, for example, supplies 24 volts DC. The other terminal 95 of the actuator motor 92 is connected intermediate the Darlington transistors 86, 90. At the end of an "on" actuation cycle, the circuit breaker 150 will be conductive and the reversing switch 94 will connect the motor terminal 93 to the negative terminal of the power supply 96. At the end of an "off" actuation cycle, the circuit breaker 150 will be non-conductive and the reversing switch 94 will connect the motor terminal 93 to the positive terminal of the power supply 96. If the reversing switch 94 is already in the proper state when the signals are delivered to the switching circuit 74, no current will flow through the actuator motor 92 for that polling time, since the motor's circuit is broken by the reversing switch 94. A pair of zener diodes 106, 108 (such as part No. 1N6283) suppress transients occurring when the motor's circuit is broken.

To enable an operator to determine the state of conductivity of each circuit breaker in the system 10, light emitting diodes (LED) 98, 100 are connected to the motor actuator 92 and the reversing switch 94. Each LED 98, 100 is also connected is series with a respective directional diode 99, 101 that blocks reverse current. A red LED 98 has its cathode connected to terminal 95 of the actuator motor 92 and its anode connected (through diode 99) to a resistor 102 which is connected to the positive terminal of the power supply 96. When the circuit breaker 150 is "closed" or "on", current flows from the positive terminal, through the resistor 102, diode 99 and the LED 98 and through the actuator motor 92 and switch 94 (which is at that time in its alternate position) to return to the negative terminal of the power supply 96. Therefore the red LED 98 is illuminated to indicate a circuit breaker which is "on." A green LED 100 has its anode connected to terminal 95 of the actuator motor 92 and its cathode connected (through diode 101) to a resistor 104 which is connected to the negative terminal of the power supply 96. The resistors 102, 104, for example, each have a resistance of 2.7K ohms. When the circuit breaker 150 is "open" or "off", current flows from the positive terminal of the supply 96, through the switch 94, actuator motor 92, diode 101 and through the LED 100 and the resistor 104 to return to the negative terminal of the supply. Therefore the green LED 100 is illuminated to indicate a circuit breaker which is "off."

By way of example, if the circuit breaker 150 is "off" and an operator wishes to turn it "on", the local switch 44 is moved from either the "off" or "auto" position to the "on" position. Current flows from the positive voltage source +V through the resistor 60 to circuit ground through the local switch 44. Therefore, the inverting input 50 of the comparator 46 receives a voltage signal of logic 0. Since the voltage signal on the inverting input 50 is lower than the voltage on the non-inverting input 48, the comparator 46 delivers a voltage signal of logic 1 to the data input line D0 of the multiplexer 34. When the binary counter 66 delivers logic 000 to the address lines A0-A2, data line D0 is polled. A voltage signal of logic 0 appears at output line o and a voltage signal of logic 1 appears at the complement output line 0. The voltage signal of logic 0 is delivered to the decoder 36 and the voltage signal of logic 1 is delivered to the decoder 38. The decoders 36, 38 route (and complement) the respective signals to their output lines Y0, Y0 in response to the logic signal 000 being delivered from the binary counter 66. The inverter 70 delivers a voltage signal of logic 0 to the base of the transistor 76, and the inverter 72 delivers a voltage signal of logic 1 to the base of the transistor 80. In response to the delivered signals, the transistor 80 becomes conductive while the transistor 76 is non-conductive. This causes the transistor 90 to become conductive while the transistor 86 is non-conductive. When the transistor 90 is conductive, the motor 92 is energized to turn on the circuit breaker 150. The motor 92 continues to be energized until the switch 94 is switched to connect the motor terminal 93 to the negative terminal of the power supply 96.

From the above description it should be apparent that the interface 120 in FIG. 3 permits the power supply 96 to have a size that is just sufficient to actuate a single circuit breaker at one time. The interface also prevents voltage sags or transients from occurring on the power system due to multiple circuit breakers closing or opening at the same time.

In accordance with an additional aspect of the invention, the rate at which multiple circuit breakers are opened or closed is reduced in response to sensing the presence of a voltage sag or transient. As shown in FIG. 3, for example, the supply voltage +V is provided by a regulator 170. The regulator 170, for example, is part No. MC78LDSC providing five volts, which works in conjunction with a capacitor 171 of 0.38 microfarads and a capacitor 172 of 0.1 microfarads. Since the power supply 96 nominally supplies 24 volts, the regulator will supply a relatively constant five volts to the time sharing interface 120 even though the output voltage of the supply 96 fluctuates due to the circuit breakers being actuated or the circuit breakers opening or closing. Therefore it is possible to use the interface 120 to control the maximum rate at which the circuit breakers are actuated by sensing the output voltage of the power supply 96 as an indication of a voltage sag or transient, and inhibiting the counter 66 in the presence of a substantial voltage sag or transient.

As further shown in FIG. 3, there is provided a circuit 180 for sensing the presence of a substantial drop in the voltage from the power supply 96. This circuit includes a comparator 181 (such as part No. LM339) which receives a relatively constant reference voltage on its inverting input, and receives a predetermined fraction of the power supply voltage on its non-inverting input. The reference voltage, for example, is 7.5 volts as provided by a zener diode 182, such as part No. 1N5236B, working in connection with a capacitor 183 of 0.01 microfarads and a resistor 184 of 27K ohms. The voltage fed to the non-inverting input of the comparator 181 is provided by a voltage divider including, for example, a 47K ohm series resistor 185, a 33K ohm shunt resistor 186, and a 0.01 microfarad capacitor 187. A 120K ohm resistor 188 provides hysteresis. Therefore the comparator will trigger when the voltage of the power supply falls below about 20 volts, or about 20% of its nominal value. To stop the actuation of the circuit breakers in the presence of this low power supply voltage, the output (G) of the comparator 181 is used as a gating signal to discharge the capacitor 161 in the oscillator 68 and therefore stop the oscillator 68, inhibit the counter 66 from counting, and inhibit the polling of the interface 14. A directional diode 189 insures that the oscillator 160 is unaffected when there is sufficient power supply voltage. When the comparator 181 no longer indicates the presence of a low power supply voltage, the counter 66 is still inhibited for the time required for the capacitor 161 to be charged through the resistor 162.

In addition to responding to a low power supply voltage due to a voltage sag or transient on the power system, the voltage sensing circuit 180 could also sense when an actuator motor 92 is being actuated to inhibit the scanning or polling by the interface means 120 to extend the actuation time until an actuated motor 90 has fully opened or closed its circuit breaker 150. In other words, a rather fast clock or scanning rate of 20 Hz could be used even though a rather slow actuator were used that would require more than one normal scanning interval (of 50 milliseconds) for the motor 92 to actuate its respective circuit breaker 92. For operation in this fashion, the power supply 96, or its output impedance, could be sized so that the current required by the motor 92 would cause the output voltage of the power supply to drop below the threshold for triggering the comparator 181.

Figure 4:
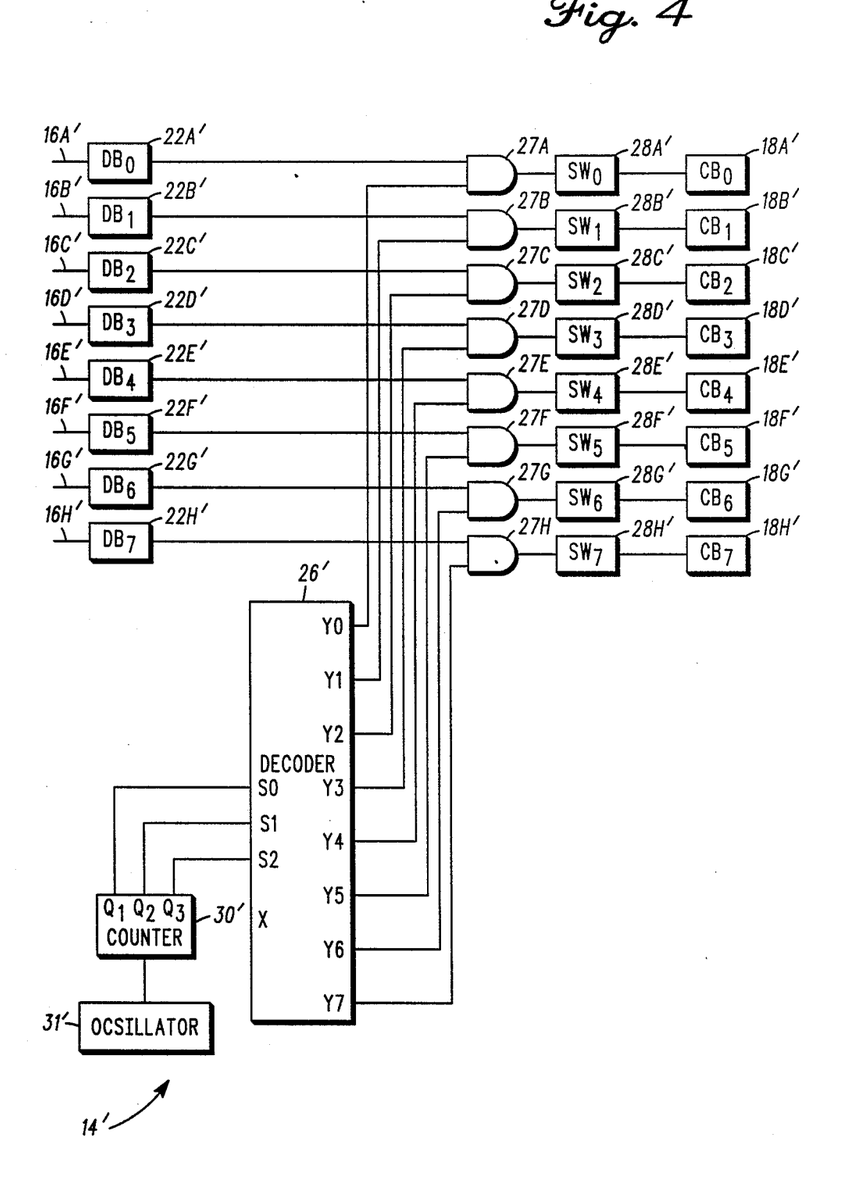
FIG. 4 is a block diagram of an alternative circuit for the time sharing interface of FIG. 2.

While the invention has been particularly shown and described with reference to a preferred embodiment, as mentioned above, it will be understood by those skilled in the art that various modifications and changes may be made to the present invention without departing from the spirit and scope thereof. One such modification is shown in FIG. 4, which is an alternative circuit for the time-sharing interface of FIG. 2. Similar components are designated by similar, but primed, reference numerals. It is apparent that in FIG. 4, the multiplexer 24 has been replaced by a set of eight AND gates 27a-27h. For implementing the time sharing interface using standard integrated circuits, the circuit of FIG. 2 is preferred because it uses fewer standard integrated circuits and has a simpler wiring pattern on a printed circuit board. The circuit of FIG. 4, however, might be preferred for a custom integrated circuit implementation.

We claim:
1. A remote controlled circuit breaker system, comprising:
 a plurality of remote control lines for conveying respective actuation signals, at least two of said remote control lines being capable of conveying the respective actuation signals at substantially the same time;
 a plurality of circuit breakers, each having means responsive to a respective one of the actuation signals for actuating the circuit breaker; and
 time-sharing interface means, responsive to said plurality of remote control lines and coupled between said plurality of circuit breakers and said plurality of remote control lines, for preventing said actuation signals from actuating more than a preselected number of said circuit breakers at substantially the same time.

2. The system as claimed in claim 1, wherein said plurality of circuit breakers share a common power supply for powering said means for actuating the circuit breakers, and said power supply has a size just sufficient to power said preselected number of said means for actuating the circuit breakers.

3. The system as claimed in claim 1, wherein said time sharing means includes means for periodically transmitting respective enabling signals to said means for actuating.

4. The system as claimed in claim 3, wherein said means for transmitting enabling signals includes a decoder having a plurality of respective outputs for providing said enabling signals and select inputs for receiving a signal for selecting a particular one of said outputs, a counter having a clock input and outputs connected to said select inputs of said decoder, and an oscillator for providing a clocking signal to said clock input of said counter.

5. The system as claimed in claim 4, further comprising means for inhibiting said counter in the presence of substantial voltage sags in a power system including said circuit breakers.

6. The system as claimed in claim 4, further comprising means for inhibiting said counter during the operation of said means for actuating.

7. A remote controlled circuit breaker system, comprising:
a plurality of remote control lines for conveying respective actuation signals, at least two of said remote control lines being capable of conveying the respective actuation signals at substantially the same time;
a plurality of circuit breakers, each having means, responsive to a respective one of the actuation signals, for actuating the circuit breaker; and
time-sharing interface means, coupled between said plurality of remote control lines and said plurality of circuit breakers, for delivering during respective time intervals said actuation signals to said means for actuating said circuit breakers, and during each respective time interval delivering actuation signals to no more than a preselected number of said means for actuating.

8. The system as claimed in claim 7, wherein said plurality of circuit breakers share a common power supply for powering said means for actuating the circuit breakers, and said power supply has a size just sufficient to power said preselected number of said means for actuating the circuit breakers.

9. The system as claimed in claim 7, wherein said time sharing means includes means for periodically transmitting enabling signals to said means for actuating.

10. The system as claimed in claim 9, wherein said means for transmitting enabling signals includes a decoder having a plurality of outputs for providing said enabling signals and select inputs for receiving a signal for selecting a particular one of said outputs, a counter having a clock input and outputs connected to said select inputs, and an oscillator for providing a clocking signal to said clock input of said counter.

11. The system as claimed in claim 10, further comprising means for inhibiting said counter in the presence of a substantial voltage sag in a power system including said circuit breakers.

12. The system as claimed in claim 10, further comprising means for inhibiting said counter during the operation of said means for actuating.

13. The system as claimed in claim 7, wherein said time-sharing interface means includes means for periodically polling said remote control lines during respective ones of said time intervals, and during each time interval passing the actuation signal from the polled remote control line to the means for actuating responsive to the actuation signal.

14. The system as claimed in claim 13, wherein said means for periodically polling includes:
a multiplexer having respective data inputs connected to said control lines for receiving said actuation signals, and select inputs for selecting a particular one of said data inputs for passing the actuation signal received on the selected data input;
a counter having outputs connected to said select inputs and a clock input; and
an oscillator for providing a clocking signal to said clock input of said counter.

15. The system as claimed in claim 13, further comprising means for inhibiting the polling of the control lines in the presence of a substantial voltage sag in a power system including the circuit breakers.

16. The system as claimed in claim 13, further comprising means for inhibiting the polling of the control lines during the operation of said means for actuating.

17. A remote controlled circuit breaker system comprising, in combination:
a plurality of remote control lines for conveying respective actuation signals; and
a plurality of circuit breakers, each having means responsive to a respective one of the actuation signals for actuating the circuit breaker;
wherein said circuit breaker system further comprises time-sharing interface means, coupled between said remote control lines and said means for actuating the circuit breakers, for periodically polling said remote control lines during respective time intervals and passing the activation signals from the polled remote control lines to the means for actuating the circuit breakers, wherein during each respective time interval only one of said control lines is polled and the actuation signal conveyed on the polled control line is passed to the means for actuating which are responsive to the actuation signal.

18. The system as claimed in claim 17, wherein said plurality of circuit breakers share a common power supply for powering said means for actuating the circuit breakers.

19. The system as claimed in claim 17, wherein said interface means includes a multiplexer for polling the control lines.

20. The remote controlled circuit breaker system as claimed in claim 19, wherein said interface means includes a demultiplexer for passing the control signal conveyed on the polled control line to the means for actuating which are responsive to the actuation signal.

21. A method for controlling a plurality of circuit breakers in response to actuation signals from a plurality of separate control lines, each of said control lines being associated with a preselected number of said circuit breakers, said method comprising the steps of:
polling each of said control lines for a predetermined period of time;
coupling a control line being polled to said preselected number of circuit breakers associated therewith for said predetermined period of time; and actuating said preselected number of circuit breakers being associated with said control line being polled in response to an actuation signal being polled.

22. The method, as set forth in claim 21, wherein each of said control lines is associated with one respective circuit breaker.

23. The method, as set forth in claim 21, wherein said step of actuating includes coupling said preselected number of circuit breakers to a power supply response to said actuation signal.

24. The method, as set forth in claim 23, wherein said power supply is coupled to said preselected number of circuit breakers for said predetermined period of time.

25. The method, as set forth in claim 21, wherein said polling is inhibited in the presence of a substantial voltage sag in a power system including said circuit breakers.

* * * * *